Oct. 9, 1951     J. E. NICKELS ET AL     2,570,263
PRODUCTION OF BETA-ETHYLNAPHTHALENE
Filed June 8, 1948
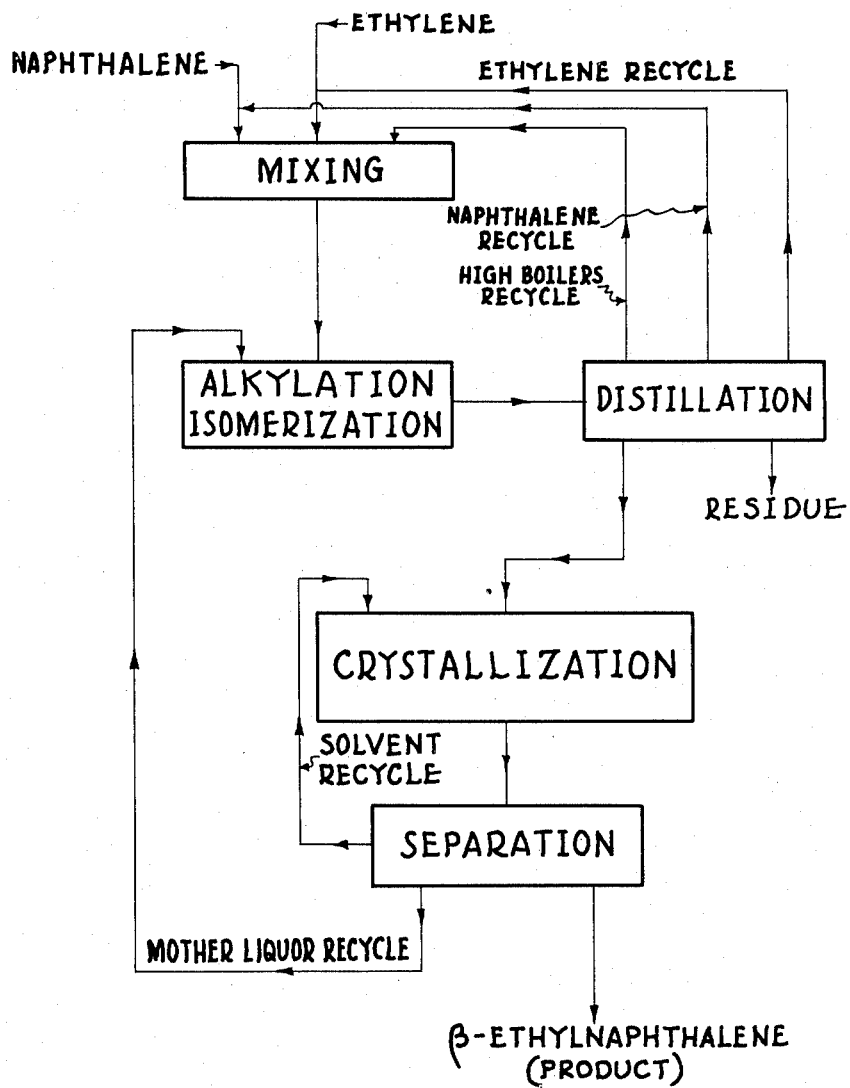
INVENTORS.
WALTER W. KUTZ, &
JOSEPH E. NICKELS.
BY
*their* ATTORNEY.

Patented Oct. 9, 1951

2,570,263

UNITED STATES PATENT OFFICE 2,570,263

PRODUCTION OF BETA-ETHYL-NAPHTHALENE

Joseph E. Nickels and Walter M. Kutz, Pittsburgh, Pa., assignors to Koppers Company, Inc., Pittsburgh, Pa., a corporation of Delaware Application June 8, 1948, Serial No. 31,756

8 Claims. (Cl. 260—671)

This invention relates to chemical processes and is particularly directed to the manufacture of beta-ethyl naphthalene.

In the catalytic alkylation of naphthalene with ethylene a mixture of alpha and beta-ethyl naphthalenes is formed. Where the beta isomer is the desired product, it is necessary to treat such mixtures for the recovery of the beta isomer. A suitable method for doing this, as disclosed in U. S. Patent 2,428,102, has the advantage of providing for effective separation of the beta isomer plus conversion of the alpha isomer to the beta isomer. In the proper operation of this process, therefore, the beta isomer is formed as the ultimate product to the exclusion of the alpha isomer.

The present invention has for its objects to provide improvements in the above described process for making beta-ethyl naphthalene. More particularly it has for its object to provide improved methods for converting alpha isomer into beta isomer in such processes; to provide more simple and efficient processes; to eliminate isomerization as a separate step; and to obtain such operative advantages as will become apparent as the description proceeds.

These objects are accomplished in the present invention by subjecting a liquid mixture of naphthalene and ethylene to the action of a silica-alumina catalyst at an alkylating temperature above about 275° C., separating ethyl naphthalene from the alkylate, crystallizing beta-ethyl naphthalene therefrom and recycling the mother liquor of said crystallization to said alkylation step. We have found by conducting the alkylation over an alumina-silica catalyst at a temperature above 275° C. that we are able to recycle the mother liquor from the crystallization which, ordinarily, will be about a 50/50 mixture of alpha and beta isomers, without any cyclic build-up of the alpha isomer in the system. It appears that the alumina-silica catalyst under conditions of the reaction acts both as an alkylating and as an isomerizing catalyst. In any event, under these circumstances it is possible to obtain an adequately high beta to alpha ratio for effective recovery of beta isomer in the crystallization without cyclic build-up of alpha isomer.

Our invention may be more fully understood by reference to the accompanying flow sheet. As illustrated therein, ethylene and naphthalene are mixed along with various recycled products under a pressure and at a temperature suitable to provide a solution of ethylene in naphthalene in proportions suitable for producing mono-ethyl naphthalene. The liquid mixture thus obtained is subjected to alkylation over a silica-alumina catalyst at a temperature above about 275° C. There is thus obtained an alkylate having a predominance of the beta isomer. This alkylate may then be subjected to fractional distillation in which unreacted ethylene and naphthalene are taken overhead and returned to the mixing step, and if desired, along with any polyethyl naphthalenes or other high boiling materials left as still residues, for recycling to the alkylation and in which the mono-ethyl naphthalenes are taken off for further processing. There is thus obtained a mixture of mono-ethyl naphthalenes containing a predominance of the beta isomer. If the alkylation is conducted as a continuous process, it is preferred that a somewhat higher temperature, say around 300° C., be used in view of the difference in the contact time. Under these conditions, i. e., a temperature above about 275° C. for a batch process and around 300° C. or more for a continuous process, alkylates containing at least 3 parts of beta isomer for each part of the alpha isomer are obtained. With alkylates containing such high beta isomer contents high recoveries of beta isomer are possible with a minimum of recycling.

For the separation of beta-ethyl naphthalene the mixed isomers are passed on to a crystallization which suitably is effected in the presence of a suitable solvent where, on cooling, the beta isomer is crystallized out in relatively pure form. The resulting slurry is then subjected to a separation in which the beta-ethyl naphthalene is recovered as product, the solvent is recovered for recycle to the crystallization, and the mother liquor, free of solvent, is recovered for recycle to the alkylation.

In accordance with a typical procedure as outlined in the accompanying flow sheet a mixture of naphthalene and ethyl naphthalenes (50% alpha+50% beta) at 90° C. is saturated with ethylene under a pressure of 200 lbs. per square inch. The feed stock thus prepared is then preheated to a temperature of 300° C. and fed upwardly through a catalyst bed charged with a synthetic silica-alumina catalyst containing 1% alumina and 99% silica at a liquid hourly space velocity of 2.5; i. e., at a rate of 2.5 volumes of liquid feed per volume of catalyst per hour. The temperature in the catalyst bed is maintained at 300° C. and the pressure at 500 p. s. i. gage. From the alkylate of a typical run in which 4064 parts of naphthalene, 100 parts of ethyl naphthalenes and 62 parts of ethylene is processed, there is obtained on distillation 270 parts of mono-ethyl naphthalene analyzing 80% beta-ethyl naphthalene and 20% alpha ethyl naphthalene. The parts are by weight whenever used unless otherwise specified.

The mixture of mono-ethyl naphthalenes thus obtained is dissolved in an equal quantity of methanol. This solution is cooled to a temperature of —40° C. to —45° C. and then seeded with crystals of beta-ethyl naphthalene which causes the beta-ethyl naphthalene to crystallize and quickly settle. The slurry of crystals thus formed is introduced into a centrifuge separator to separate the mother liquor from the beta-ethyl naphthalene. The beta-ethyl naphthalene crystals are then washed with more methanol to obtain a beta-ethyl naphthalene of a high degree of purity; i. e., from 95% to 97%. If a higher degree of purity is desirable, the 95% to 97% beta-ethyl naphthalene may be dissolved in an equal quantity of methanol and recrystallized at a temperature of from —40 to —50° C. to give substantially pure beta-ethyl naphthalene.

The mother liquor from the above crystallization, along with any wash liquors, after distillation to remove the solvent, will contain approximately equal amounts of the two isomers. Theoretically it should be possible to obtain or to approach the eutectic mixture which contains about 56% of alpha isomer and about 44% of beta-ethyl naphthalene. In a practical manner, however, the beta isomer content will ordinarily be somewhat higher than the eutectic. Thus, ordinarily, the mother liquor will contain about 51% to 53% of beta-ethyl naphthalene and 49% to 47% of alpha-ethyl naphthalene and will have a freezing point in the order of —32° F. Under these conditions there is recovered as mother liquor approximately 100 parts of mixed ethyl naphthalenes substantially as a 50/50 mixture for recycling to the alkylation step.

In place of methanol other solvents may be used such as ethanol, and isopropanol in like quantities or, even in smaller amounts, gasoline, toluene or other low freezing nonviscous solvents.

It will be seen from the foregoing that we have described a novel procedure for the preparation of beta-ethyl naphthalene the effectiveness of which is largely dependent upon our discovery that by using an alumina-silica catalyst and a temperature of above about 275° C. we are able to effect simultaneous alkylation and isomerization. It is therefore possible, according to our invention to dispense with a step heretofore considered essential in the prior art and still to accomplish the same results.

Catalysts suitable for carrying out processes according to the invention may be either natural or synthetic silica-alumina complexes. Those containing from about 1 to about 95% alumina are particularly effective. They may be formed by precipitating alumina in silica gel or vice versa, or they may be prepared by suitably activating natural clays. The acid-activated sub-bentonites, such as are obtainable under such names as Filtrol, may be used effectively. Typical silica-alumina catalysts and suitable methods for their preparation are well known in the art, for example, as disclosed and described in U. S. Patents 2,222,632; 2,366,217; 2,115,884; 2,282,922; 2,287,917; 2,329,307; 2,242,553; 2,270,090; 2,285,314 and 2,229,353.

The pressures involved in the alkylation may be varied over a wide range as long as it is maintained above the critical pressure. In other words, the pressure should be high enough to maintain a liquid phase process. A pressure of 500 lbs. per square inch has been found suitable, though higher pressures within the limits of the apparatus involved may be used. Low pressures down to the critical pressure may be used. Ordinarily a pressure between about 100 and about 1000 lbs. per square inch gage will suffice.

The contact time, likewise, may be varied as long as sufficient time is allowed to give an alkylate having the desired high beta content. In a continuous process a liquid hourly space velocity of 2.5 has been found suitable at 300° C. Higher or lower space velocities may be used, particularly at higher or lower temperatures respectively, or if it is suitable to operate the process with an alkylate having a ratio of beta to alpha isomers less than three. Ordinarily, the desired ratio can be obtained with hourly space velocities between about one and about four, especially when the temperature is around about 300° C. A lower temperature down to about 275° may be used, especially in the batch process, or if it is suitable to operate the process with a low grade alkylate; i. e., with one containing less than three parts of beta isomer for each part of alpha isomer. Higher temperatures up to 350° C. or more be used, but temperatures above 350° C. tend to cause excessive decomposition.

In the alkylation an excess of naphthalene is desirable. Ordinarily from 2 to 10 mols of naphthalene for each mole of ethylene will be suitable.

While we have described our invention with reference to particular embodiment thereof, it will be understood that variation may be made therein without departing from the spirit and scope of the invention as set forth herein and in the appended claims.

We claim:

1. In a process for the manufacture by the alkylation of naphthalene with ethylene of a mixture of mono-ethyl naphthalenes containing a high ratio of beta-ethyl naphthalene to alpha-ethyl naphthalene the steps of heating a mixture of liquid naphthalene and ethylene in contact with a silica-alumina catalyst at an alkylating temperature above 275° C. until an alkylate containing at least 3 parts of beta isomer for each part of alpha isomer is obtained, separating a portion of the beta isomer from the alkylate thus obtained, and recycling the remainder of the ethyl naphthalenes to said alkylation.

2. The process of claim 1 in which the alkylation is effected at a temperature of about 300° C. at a liquid hourly space velocity between 1 and 4.

3. The process of claim 2 in which beta-ethyl naphthalene is separated from the alkylate by separating the mono-ethyl naphthalenes from the alkylate, dissolving the separated mono-ethyl naphthalenes in a low freezing solvent nonviscous at the melting point of the ethyl naphthalene isomer eutectic, cooling the solution to a temperature of minus 40° C. to minus 45° C. to crystallize out beta-ethyl naphthalene, separating the crystals from the mother liquor, and separating the solvent therefrom and in which the solvent-free mother liquor is returned to the mixture of liquid naphthalene and ethylene which is subjected to the alkylation.

4. The process of claim 3 in which the solvent is methanol.

5. The process of claim 1 in which the mixture of liquid naphthalene and ethylene contains from 2 to 10 moles of naphthalene for each mole of ethylene and is passed in contact with the catalyst at a temperature between 275° C. and 350° C. at a liquid hourly space velocity between 1 and 4 and at a pressure between about 100 and 1000 pounds per square inch.

6. The process of claim 5 in which beta-ethyl naphthalene is separated from the alkylate by separating the mono-ethyl naphthalenes from the alkylate, dissolving the separated mono-ethyl naphthalenes in a low freezing solvent non-viscous at the melting point of the ethyl naphthalene isomer eutectic, cooling the solution to a temperature of minus 40° C. to minus 45° C. to crystallize out beta-ethyl naphthalene, separating the crystals from the mother liquor, and separating the solvent therefrom and in which the solvent-free mother liquor is returned to the mixture of liquid napthalene and ethylene which is subjected to the alkylation.

7. The process of claim 6 in which the solvent is methanol.

8. In a process for the manufacture by the alkylation of naphthalene with ethylene of a mixture of mono-ethyl naphthalenes containing a high ratio of beta-ethyl naphthalene to alpha-ethyl naphthalene the steps of heating a mixture of liquid naphthalene and ethylene in contact with a silica-alumina catalyst at an alkylating temperature above 275° C. until an alkylate containing at least 3 parts of beta isomer for each part of alpha isomer is obtained, separating the alkylate into two mono-ethyl naphthalene fractions, one of which contains a higher ratio of beta to alpha isomer than that of the alkylate and the other of which contains a lower ratio of beta to alpha isomer than that of the alkylate and returning said other fraction to the alkylation.

JOSEPH E. NICKELS.
WALTER M. KUTZ.

REFERENCES CITED

The following references are of record in the file of this patent:

UNITED STATES PATENTS

| Number | Name | Date |
|---|---|---|
| 2,403,757 | Reeves | July 9, 1946 |
| 2,425,559 | Passino et al. | Aug. 12, 1947 |
| 2,428,102 | Swietoslawski | Sept. 30, 1947 |

OTHER REFERENCES

Dobryanskii et al., "Mechanism Of Aromatization And Xylene Thermal Isomerization." Oil & Gas Journal, Aug. 8, 1940. Page 48 (1 page only).

Egloff et al., Isomerization of Pure Hydrocarbons, Reinhold Pub. Corp., New York (1942). Pages 190, 191, 386, 387, 467, 469 (6 pages).